US012354572B2

(12) United States Patent
Hollander et al.

(10) Patent No.: US 12,354,572 B2
(45) Date of Patent: Jul. 8, 2025

(54) ACOUSTIC DAMPENER FOR BANJOS

(71) Applicant: Rad Rocket Interactive LLC, Kings Park, NY (US)

(72) Inventors: Eric Hollander, Kings Park, NY (US); Deborah Hollander, Kings Park, NY (US)

(73) Assignee: Rad Rocket Interactive LLC, Kings Park, NY (US)

( * ) Notice: Subject to any disclaimer, the term of this patent is extended or adjusted under 35 U.S.C. 154(b) by 253 days.

(21) Appl. No.: 18/203,934

(22) Filed: May 31, 2023

(65) Prior Publication Data

US 2024/0233686 A1 Jul. 11, 2024

Related U.S. Application Data

(60) Provisional application No. 63/479,367, filed on Jan. 11, 2023.

(51) Int. Cl.
*G10D 3/046* (2020.01)

(52) U.S. Cl.
CPC .................................... *G10D 3/046* (2013.01)

(58) Field of Classification Search
CPC ...................................................... G10D 3/046
See application file for complete search history.

(56) References Cited

U.S. PATENT DOCUMENTS

| | | | | |
|---|---|---|---|---|
| 754,059 | A * | 3/1904 | Purbershaw | G10D 3/046 84/273 |
| 4,244,266 | A * | 1/1981 | Hardy | G10D 13/02 984/151 |
| 4,567,807 | A * | 2/1986 | Robinson | G10D 13/14 984/151 |
| 5,587,543 | A * | 12/1996 | Da Silva Marques | G10D 13/02 84/411 M |
| 8,148,619 | B1 * | 4/2012 | May | G10D 13/14 84/411 R |
| 2024/0233686 | A1 * | 7/2024 | Hollander | G10D 3/046 |

FOREIGN PATENT DOCUMENTS

| | | | | |
|---|---|---|---|---|
| EP | 1742198 | A2 * | 1/2007 | G10D 13/06 |

* cited by examiner

*Primary Examiner* — Robert W Horn
(74) *Attorney, Agent, or Firm* — David L. Nocilly; Bond Schoeneck & King PLLC

(57) ABSTRACT

A dampener for a banjo that attenuates unwanted overtones/reverberation while preserving the all-important fundamental sound with minimal reduction in bass, treble and volume. The dampener has a cylindrical outer shell having a diameter of about two inches and a length corresponding to the inner arc of the banjo. The cylindrical outer shell is formed from a cotton poplin fabric, and the filling comprises polyester fibers.

19 Claims, 5 Drawing Sheets

ACOUSTIC DAMPENER FOR BANJOS

BACKGROUND OF THE INVENTION

1. Field

The present disclosure relates to devices that enhance the tone of musical instruments and, more specifically, to a device that reduces unwanted overtones and reverberation caused by reflected sound inside the tone chamber of an open back banjo or resonator banjo pot.

2. Description of the Related Art

Open back banjos are used primarily to play old-time music and are configured differently from resonator banjos, used primarily to play bluegrass music. Whereas a resonator banjo will most often be set up with a high head tension, open back banjos generally use lower head tension to mellow the tone and enhance the instrument's bass response—often referred to as a "plunky" sound.

The banjo's circular tone chamber creates enhanced opportunities for reflected sound inside the banjo's pot. In this context, reflected sound is referred to as sound produced as a by-product of the fundamental sound created by the transference of energy from a vibrating string through the bridge and on to the banjo head. Reflected sound is most often perceived as undesirable overtones and/or reverberation which has the effect of muddying the banjo's tone, reducing note clarity and articulation.

It is common practice for many old-time banjo players to "stuff" their banjo pot by placing a soft, flexible object between the banjo head and the dowel stick or coordinator rod(s). The object exerts direct pressure on the banjo head, dampening the head's vibrations in an effort to attenuate unwanted overtones/reverberation. Some example materials used are foam rubber, rolled towels, rolled rags, socks, felt pads and even small stuffed toys. Unfortunately, these methods have the unwanted side effects of reducing both the banjo's bass and treble response as well as a noticeable reduction in volume, resulting in an overly compressed and flattened sound.

BRIEF SUMMARY OF THE INVENTION

The present invention solves these problems by providing a dampener formed as a cylindrical shell that is filled with polyester fibers and dimensioned to match the inner art of the banjo rim and be positioned therein. The dampener attenuates unwanted overtones/reverberation while preserving the all-important fundamental sound with minimal reduction in bass, treble and volume. By treating the banjo's tone chamber as an acoustic space and focusing on dampening reflected sound, the present invention functions as a sound absorber, designed specifically to remove unwanted sonic energy from the sound chamber caused by reflected sound. The present invention is further designed to allow the user to easily adjust the amount of overtone/reverberation attenuation needed by how the device is positioned inside the banjo, thus providing a wide range of control and customization over their desired tone. The present invention is also designed to be easily inserted and removed from the banjo, as needed, and does not require any alteration to the instrument.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION

Figure 1:
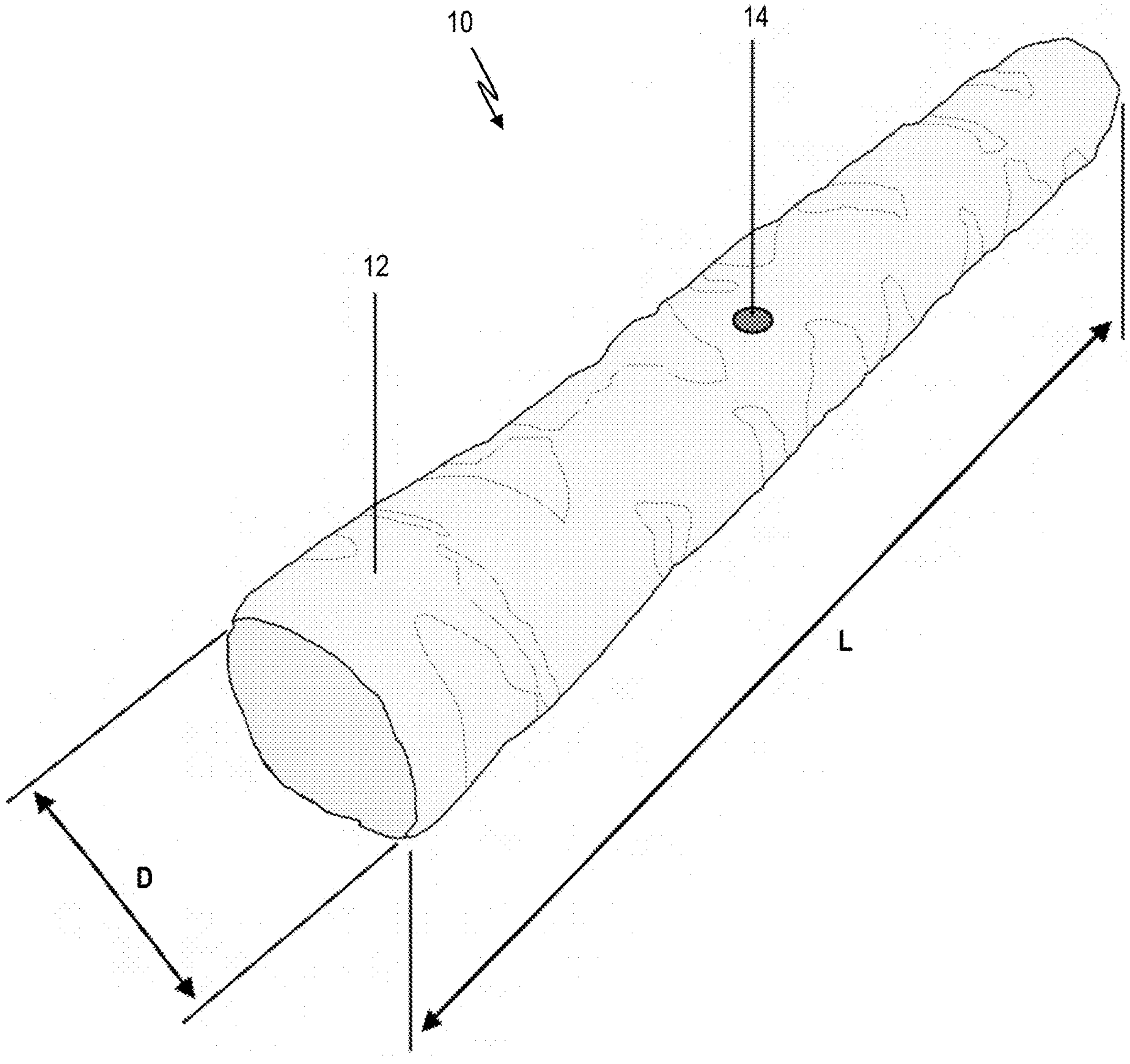
FIG. 1 is a perspective view of a dampener for a banjo according to the present invention.
Figure 2:
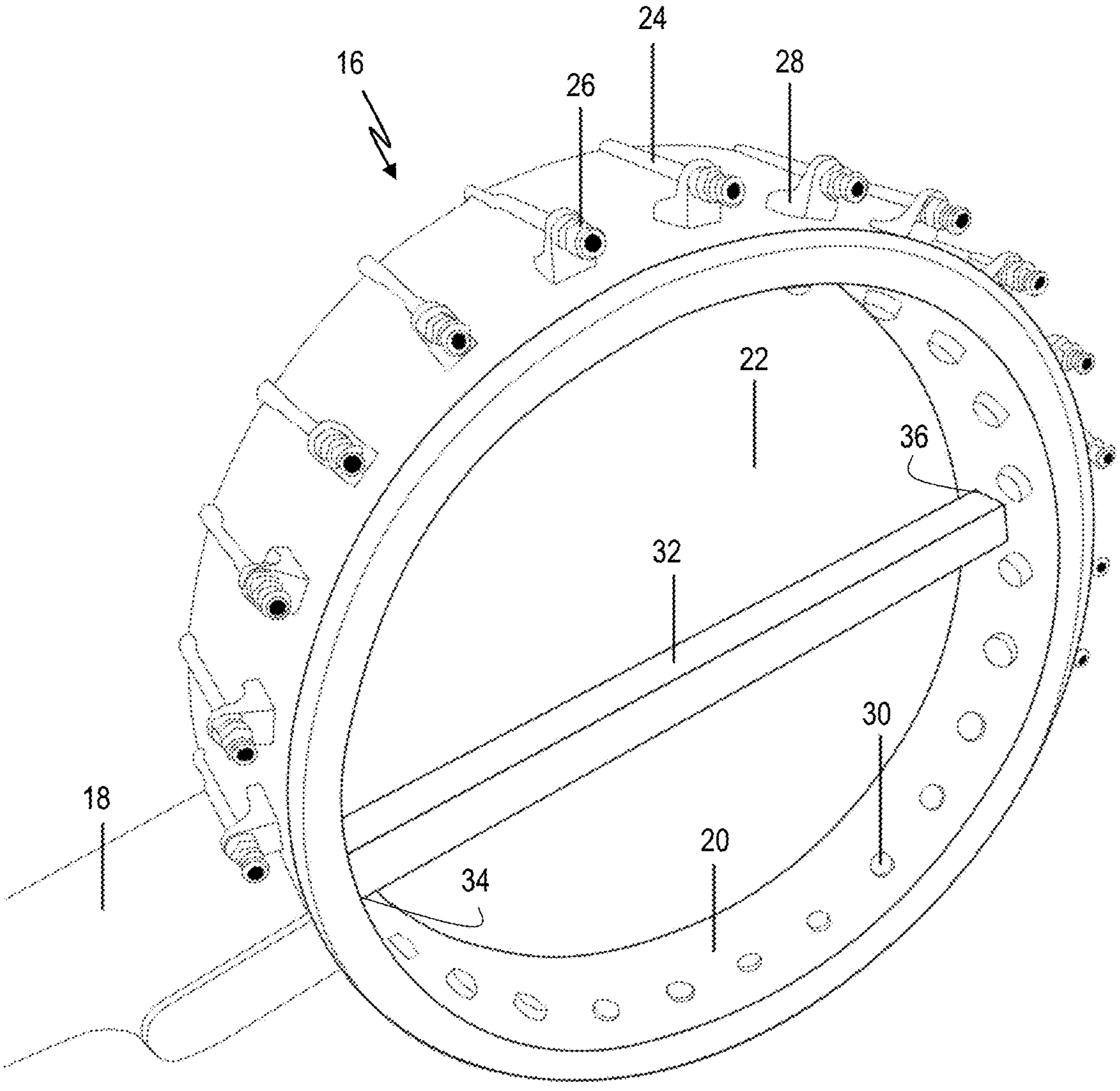
FIG. 2 is a perspective view of a banjo to be outfitted with a dampener according to the present invention.

Referring to the figures, wherein like numerals refer to like parts throughout, there is seen in FIG. 1, a banjo dampener 10 comprising a cylindrical fabric outer shell 12 with a diameter (D) of about two inches. Outer shell 12 made from cotton poplin fabric and filled with polyester fiber 14. Banjo dampener 10 is configured for use with an open back banjo 16, such as that seen in FIG. 2. Open back banjo 16 includes a neck 18 coupled to a rim 20. A head 22 is attached over rim 20 by bracket hooks 24, bracket nuts 26, and bracket shoes 28 secured to rim 20 by rim bolts 30. A dowel stick 32 extends across the inside of banjo 16 from a first location 34 proximate to neck 18 to a second location 36 on the opposite side of rim 20. As described herein, banjo 16 may alternatively include one or more coordinator rods 50 in lieu of dowel stick 32.

Figure 3:
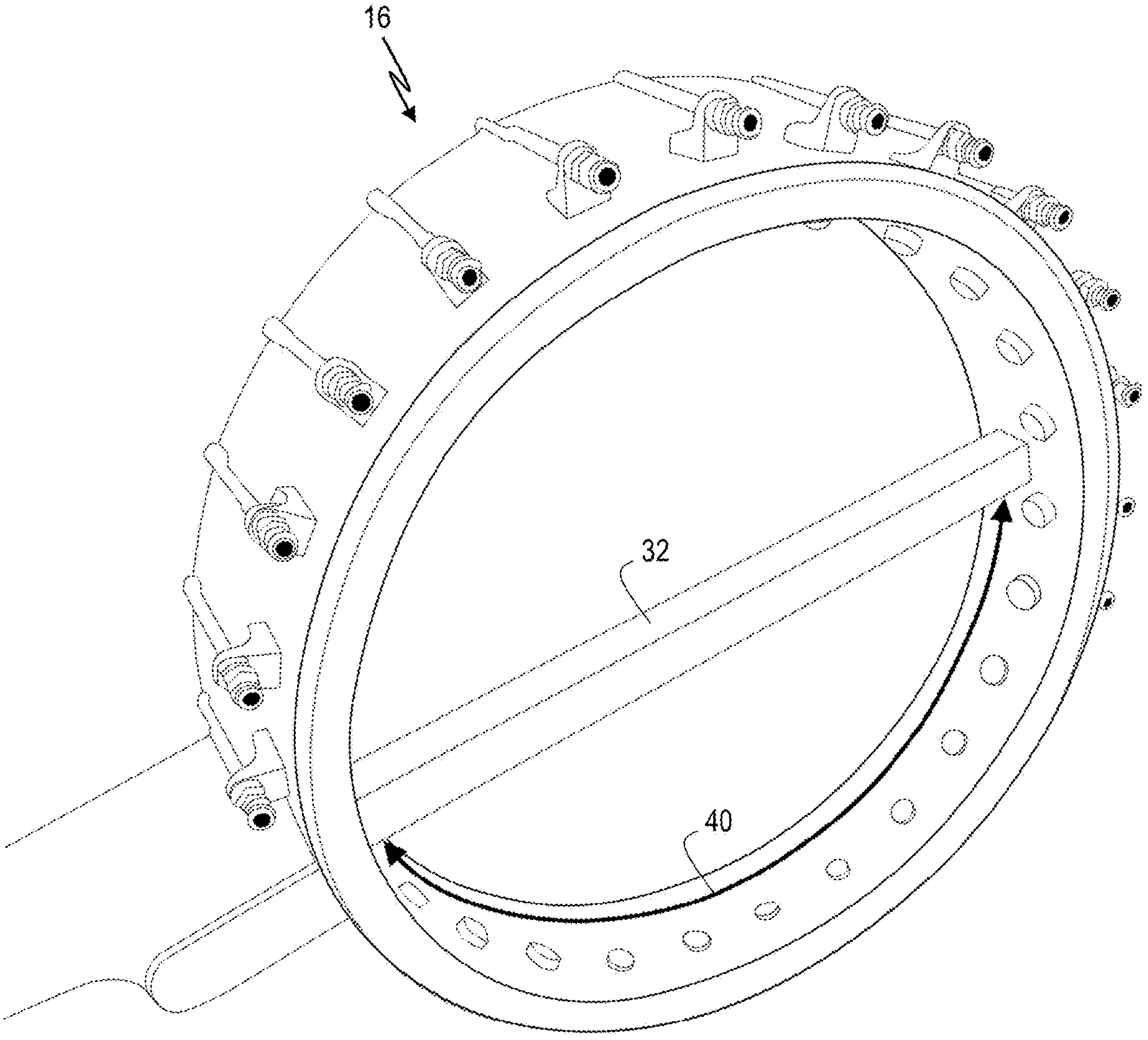
FIG. 3 is a perspective view of a banjo illustrating an approach for determining the proper length for a dampener according to the present invention.

Referring to FIG. 3, the length (L) of banjo dampener 10 is configured to correspond to the dimensions of banjo 16 in which it is to be used, as determined by the distance along an inner arc 40 of rim 20 from one end of the dowel stick/coordinator rod(s) to the other. Thus, for the purposes of the present application, the term "inner arc" refers to a length that is one half the circumference of rim 20 less the thickness of the dowel stick 32 or coordinator rod(s) 50.

Cotton poplin fabric was selected for the outer shell based on its sonic properties as well as its ability to adapt to the shape of the banjo rim and hold the invention's desired configuration while positioned inside the banjo. See Table 1 below for a comparison of different fabrics considered for use in the design of this invention. Table 1 shows a comparison of different fabric and fill types and their effect on volume attenuation, bass attenuation, treble attenuation, overtone attenuation, the adjustability of the invention's position when placed inside the banjo rim, and how well the invention holds its shape after being placed.

TABLE 1

Fabric and Fill Type Comparisons

| Fabric | Fill Type | Fill Amount | Volume Atten. | Bass Atten. | Treble Atten. | Overtone Atten. | Adjust. | Holds Position |
|---|---|---|---|---|---|---|---|---|
| Cotton Poplin | Polyester Fill | 1.9 grams per inch | 1.0 | 1.0 | 1.0 | 3.0 | 5.0 | 5.0 |
| | 80/20 Cotton Poly Batting | 2.2 grams per inch | 2.5 | 2.5 | 2.5 | 4.0 | 3.0 | 5.0 |
| | Memory Foam | 3.4 grams per inch | 4.0 | 4.0 | 3.5 | 4.0 | 5.0 | 5.0 |
| | Polystyrene Beads | 1.1 grams per inch | 2.0 | 2.0 | 1.5 | 3.0 | 2.0 | 3.0 |
| Quilting Cotton | Polyester Fill | 1.9 grams per inch | 2.0 | 2.0 | 2.0 | 3.0 | 4.0 | 4.0 |
| | 80/20 Cotton Poly Batting | 2.2 grams per inch | 3.5 | 3.5 | 3.5 | 4.0 | 3.0 | 5.0 |
| | Memory Foam | 3.4 grams per inch | 4.0 | 4.0 | 3.0 | 4.0 | 5.0 | 5.0 |
| | Polystyrene Beads | 1.1 grams per inch | 3.0 | 2.0 | 2.0 | 3.0 | 2.0 | 3.0 |
| Polyester | Polyester Fill | 1.9 grams per inch | 1.5 | 2.0 | 2.0 | 4.0 | 4.0 | 4.0 |
| | 80/20 Cotton Poly Batting | 2.2 grams per inch | 3.0 | 3.5 | 2.5 | 4.0 | 3.5 | 3.5 |
| | Memory Foam | 3.4 grams per inch | 4.5 | 5.0 | 4.0 | 4.5 | 5.0 | 5.0 |
| | Polystyrene Beads | 1.1 grams per inch | 2.5 | 2.5 | 2.5 | 3.5 | 2.0 | 3.0 |
| Polyester Blend | Polyester Fill | 1.9 grams per inch | 1.0 | 1.0 | 3.0 | 3.5 | 5.0 | 5.0 |
| | 80/20 Cotton Poly Batting | 2.2 grams per inch | 2.5 | 3.0 | 2.0 | 4.0 | 3.0 | 5.0 |
| | Memory Foam | 3.4 grams per inch | 4.0 | 4.0 | 3.0 | 4.0 | 5.0 | 5.0 |
| | Polystyrene Beads | 1.1 grams per inch | 2.0 | 2.5 | 2.0 | 3.0 | 2.0 | 3.0 |
| Linen | Polyester Fill | 1.9 grams per inch | 2.0 | 1.0 | 3.0 | 3.0 | 5.0 | 5.0 |
| | 80/20 Cotton Poly Batting | 2.2 grams per inch | 3.0 | 3.0 | 2.5 | 4.0 | 3.0 | 4.5 |
| | Memory Foam | 3.4 grams per inch | 4.5 | 4.0 | 3.5 | 4.0 | 5.0 | 5.0 |
| | Polystyrene Beads | 1.1 grams per inch | 2.5 | 2.0 | 3.0 | 3.5 | 2.0 | 3.0 |

Legend

| Data Point | 1 | 5 | IDEAL VALUE |
|---|---|---|---|
| Volume Attenuation | Least | Most | 1 |
| Bass Attenuation | Least | Most | 1 |
| Treble Attenuation | Least | Most | 1 |
| Overtone Attenuation | Least | Most | 3 |
| Adjustability | Minimal Adjustability | Maximum Adjustability | 5 |
| Holds Position | Minimal Hold | Maximum Hold | 5 |

Polyester fill was selected based on its sonic properties as well as its ability to adapt to the shape of the banjo rim and hold the invention's desired configuration while positioned inside the banjo. See Table 1 above for a comparison of different fill types explored in the design of this invention.

The amount of polyester fill used is 1.9 grams per inch of length. Alternative amounts were explored in the design of this invention and 1.9 grams per inch was determined to be optimum. Different diameters were also explored in the design of this invention and a size of two inches was selected based on its sonic properties as well as allowing the invention's placement to be easily adjusted while accommodating a wide variety of banjo rim depths.

Figure 4:
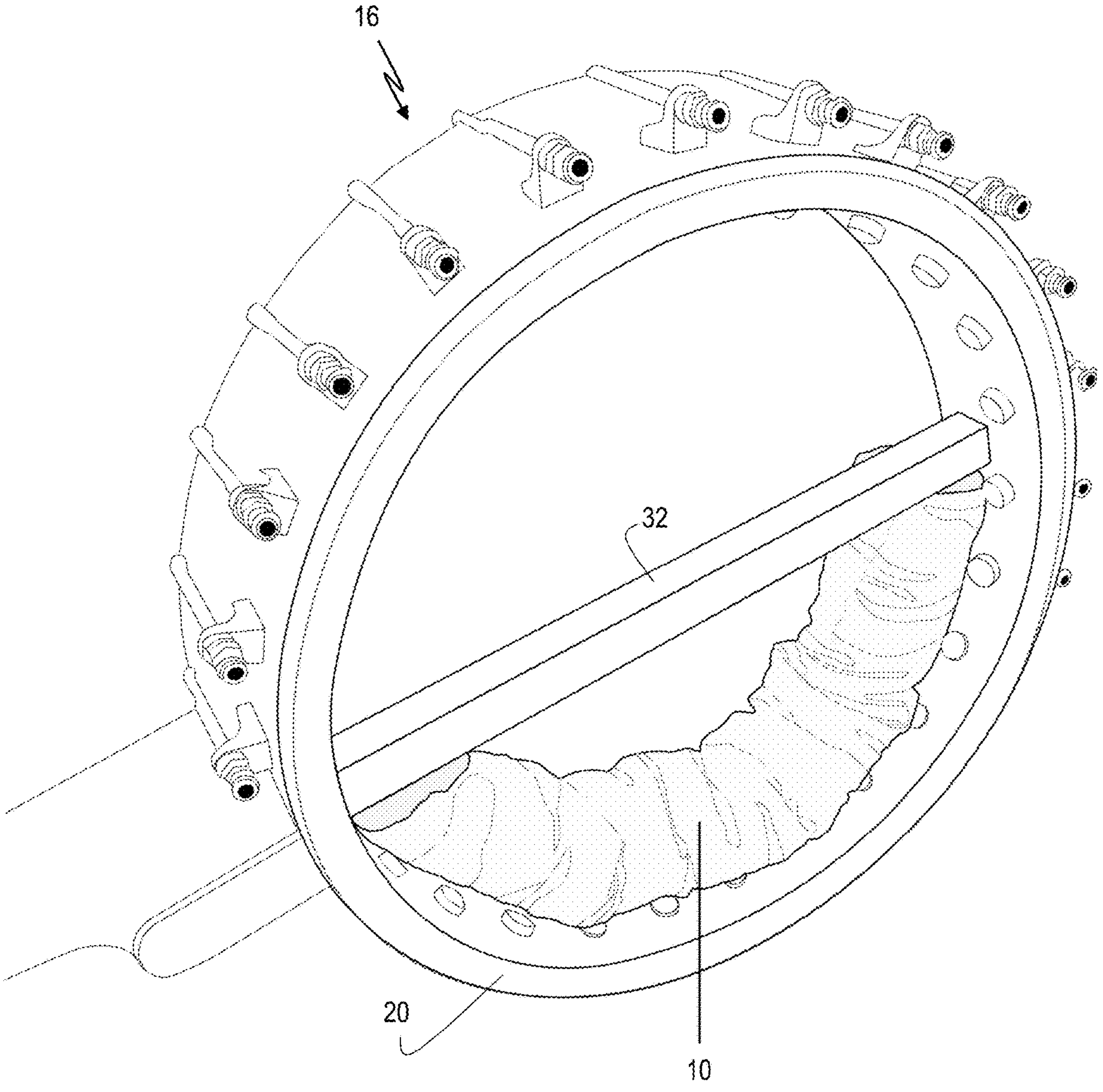
FIG. 4 is a perspective view of a dampener according to the present invention positioned inside a banjo head having a dowel stick.
Figure 5:
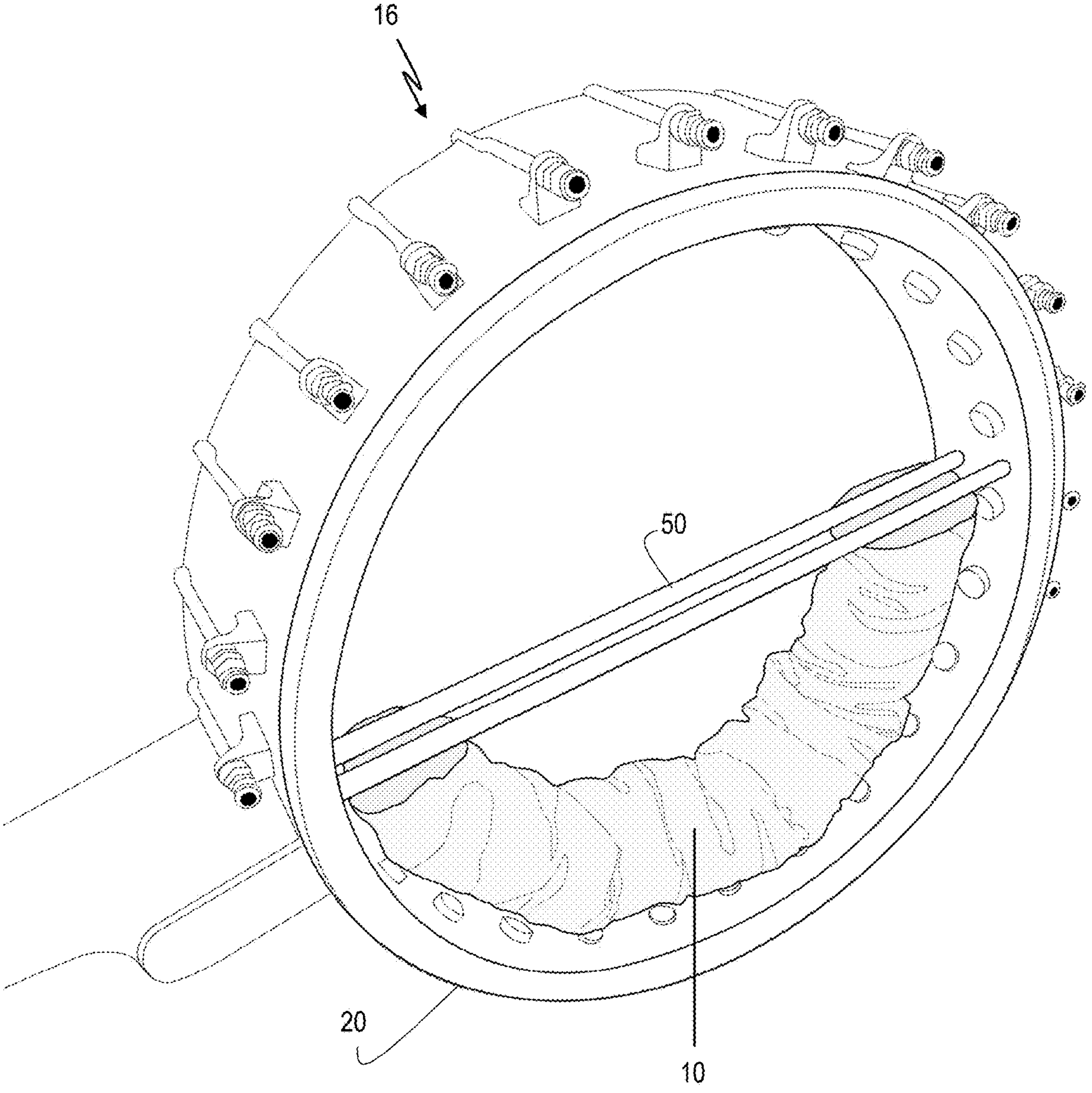
FIG. 5 is a perspective view of a dampener according to the present invention positioned inside a banjo having coordinator rods.

The present invention is designed to be placed in either the lower or upper, inner arc of the banjo pot, with each end contacting the dowel stick or coordinator rod(s) perpendicularly. The length of the present invention will follow the curve of the banjo rim and make gentle contact with the underside of the banjo head, as seen in FIGS. 4 and 5. In this standard configuration, the present invention provides significant overtone/reverberation reduction with minimal impact on bass response and overall volume.

For banjos with Dobson tone rings, or other tone rings that prevent simultaneous direct contact of the present invention with both the banjo rim and head, the invention will be placed on the inner curve of the tone ring and rest against it instead of the rim.

The present invention is designed to be easily adjusted to achieve the desired amount of overtone/reverberation attenuation. This is determined by how much of the present invention contacts the underside of the banjo head and by how much pressure is applied to the head. The present invention is flexible and can be adjusted so that all or none of its length contacts the banjo head. The least amount of overtone/reverberation removal is achieved when there is no contact with the head. In contrast, maximum overtone/ reverberation removal is achieved when the entire length of the present invention contacts the banjo head and maximum pressure is applied by pushing the present invention against the head when it is placed inside the banjo. In addition to these two extremes, the present invention can be shaped so that only a portion contacts the banjo head or that most of the present invention contacts the banjo head and only a portion does not. This flexibility allows the user to achieve their own unique tone and maximize the sonic potential of their specific instrument.

This adjustability is also of importance to banjo players who perform in outdoor venues, especially those using hide heads. Temperature and humidity changes can adversely affect the sound of the banjo, making it challenging to achieve the desired tone while playing outdoors. The adjustability of the present invention makes it possible to quickly increase or decrease overtone/reverberation attenuation to efficiently adapt to the musician's playing environment.

The present invention is designed to stay inside the banjo as long as the user desires. Due to the cotton poplin outer shell and precise amount of fill used, it will gently hold its position until manually readjusted or removed. The soft cotton poplin outer shell along with the soft polyester fill assures that the invention will not scratch or damage the banjo in any way.

Table 2 below shows a direct comparison between the present invention and a common form of conventional banjo stuffing—foam rubber. The foam rubber used was 3"×1.5" and was placed between the dowel stick/coordinator rod(s) and the banjo head, at the neck end of the banjo. The foam rubber size and placement location were found to yield the optimum results.

nator rods of the banjo. When using this configuration, the invention will not contact the banjo head or rim and is designed specifically for resonator banjos but may also be used in open back banjos that are equipped with dual coordinator rods.

What is claimed is:

1. A dampener for placement in an inner arc of a rim of a banjo, comprising:
- an outer shell having a predetermined diameter and a predetermined length corresponding to at least a portion of the inner arc of the banjo; and
- a filling positioned in the outer shell.

2. The dampener of claim 1, wherein the outer shell is a cylinder and the predetermined diameter is two inches.

3. The dampener of claim 2, wherein the outer shell is formed from a cotton poplin fabric.

4. The dampener of claim 3, wherein the filling is a plurality of fibers formed from polyester.

5. The dampener of claim 1, wherein the filling is polyester.

6. The dampener of claim 1, wherein the filling is present in an amount of 1.9 grams per inch of the length.

7. A banjo, comprising:
- a rim;
- at least one element attached to and extending across the rim from a first point to a second point; and
- a dampener extending at least partially around the rim between the first point and the second point, wherein the dampener comprises an outer shell having a predetermined diameter and a predetermined length and a filling positioned in the outer shell.

| | Fabric | Fill Type | Fill Amount | Volume Atten. | Bass Atten. | Treble Atten. | Overtone Atten. | Adjust. | Holds Position |
|---|---|---|---|---|---|---|---|---|---|
| Dampener 10 | Cotton Poplin | Polyester Fill | 1.9 grams per inch | 1.0 | 1.0 | 1.0 | 3.0 | 5.0 | 5.0 |
| Foam Rubber | None | N/A | N/A | 2.0 | 3.5 | 2.0 | 1.5 | 2.0 | 5.0 |

Legend

| Data Point | 1 | 5 | IDEAL VALUE |
|---|---|---|---|
| Volume Attenuation | Least | Most | 1 |
| Bass Attenuation | Least | Most | 1 |
| Treble Attenuation | Least | Most | 1 |
| Overtone Attenuation | Least | Most | 3 |
| Adjustability | Minimal Adjustability | Maximum Adjustability | 5 |
| Holds Position | Minimal Hold | Maximum Hold | 5 |

From this testing, it may be concluded that foam rubber is not as effective as the present invention in attenuating overtones/reverberation. When foam rubber was used there was a noticeable loss of volume, bass response and treble response as compared to the present invention, resulting in an overly compressed and flattened sound. In addition, foam rubber must always contact the banjo head in order to hold its position. As a result, foam rubber does not offer the wide range of adjustability and control over the desired tone as this invention. Further testing was performed using a wide variety of common stuffing materials (as described in the Background of this Invention section) and the results were nearly identical to foam rubber.

In addition to placing the present invention in an inner arc of a banjo rim, a shorter length version measuring between seven and nine inches may be placed between the coordi-

8. The banjo of claim 7, wherein the dampener is cylindrical.

9. The banjo of claim 8, wherein the at least one element is a dowel stick.

10. The banjo of claim 9, wherein the at least one element is a pair of coordinator rods.

11. The banjo of claim 10, wherein the filling is present in an amount of 1.9 grams per inch of the length.

12. The banjo of claim 11, wherein the banjo is an open back banjo.

13. The banjo of claim 12, wherein the banjo is a resonator banjo.

14. A method of enhancing sound of a banjo, comprising the step of inserting a dampener along an inside of a rim of the banjo, wherein the dampener extends at least partially around the inside of the rim between a first point of attachment of at least element extending across the rim and a second point of attachment of the at least one element extending across the rim, and wherein the dampener comprises an outer shell having a predetermined diameter and a filling positioned in the outer shell.

15. The method of claim 14, wherein the dampener is cylindrical.

16. The method of claim 15, wherein the at least element is a dowel stick.

17. The method of claim 16, wherein the at least one element is a pair of coordinator rods.

18. The method of claim 17, wherein the outer shell is formed from a cotton poplin fabric.

19. The method of claim 18, wherein the filling is a plurality of fibers formed from polyester.

* * * * *